and to the tooling plate to the or–

(12) United States Patent
Shi et al.

(10) Patent No.: US 10,087,999 B2
(45) Date of Patent: Oct. 2, 2018

(54) TOOLING PIVOT

(71) Applicant: GM GLOBAL TECHNOLOGY OPERATIONS LLC, Detroit, MI (US)

(72) Inventors: Jianying Shi, Oakland Township, MI (US); Scott A. McLeod, Windsor (CA); Justin Jay Hackett, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 382 days.

(21) Appl. No.: 14/830,296

(22) Filed: Aug. 19, 2015

(65) Prior Publication Data

US 2017/0050279 A1 Feb. 23, 2017

(51) Int. Cl.
| | |
|---|---|
| *F16D 55/225* | (2006.01) |
| *B23Q 3/18* | (2006.01) |
| *B23Q 16/10* | (2006.01) |
| *B23Q 1/48* | (2006.01) |

(52) U.S. Cl.
CPC ............. *F16D 55/225* (2013.01); *B23Q 1/48* (2013.01); *B23Q 3/18* (2013.01); *B23Q 16/105* (2013.01)

(58) Field of Classification Search
CPC ... B23Q 3/18; B23Q 3/06; B23Q 1/72; B23Q 16/105
See application file for complete search history.

(56) References Cited

U.S. PATENT DOCUMENTS

| | | | | |
|---|---|---|---|---|
| 3,744,124 A | * | 7/1973 | Gardner | B23Q 3/15546 29/26 A |
| 3,850,051 A | * | 11/1974 | Woltjen | B23Q 1/287 74/821 |
| 3,942,254 A | * | 3/1976 | Thompson | G01B 7/283 33/501.9 |
| 4,159,658 A | * | 7/1979 | Parkinson | B23Q 16/102 74/813 L |
| 4,617,720 A | * | 10/1986 | Palfery | B23Q 1/522 409/221 |

(Continued)

FOREIGN PATENT DOCUMENTS

| | | |
|---|---|---|
| CN | 101155656 A | 4/2008 |
| WO | 2014060435 A1 | 4/2014 |

OTHER PUBLICATIONS

Goudsmit Magnetic Systems, brochure entitled "Magnet Grippers"; accessed Aug. 14, 2014; 4 pages.

*Primary Examiner* — Christopher M Koehler
*Assistant Examiner* — Seahee Yoon
(74) *Attorney, Agent, or Firm* — Quinn IP Law

(57) ABSTRACT

A tooling pivot is configured to pivot and to hold a tool in a plurality of operating positions. The tooling pivot includes a bracket, a tooling plate, a motor, a brake, and a controller. The tooling plate is connected to the bracket, connectable to the tool, and rotatable. The motor is connected to the bracket and to the tooling plate and is configured to rotate the tooling plate to an operating position. The brake is connected to the bracket and is configured to hold the tooling plate in the operating position. The controller is connected to the motor and to the brake and is configured to control the motion and position of the tooling plate and to control the holding of the tooling plate. The brake is configured to release the tooling plate when the motor rotates the tooling plate to the operating position.

10 Claims, 1 Drawing Sheet

(56) References Cited

U.S. PATENT DOCUMENTS

| | | | | |
|---|---|---|---|---|
| 4,936,559 | A * | 6/1990 | Diaz Torga | B23Q 1/30 269/63 |
| 4,978,080 | A * | 12/1990 | Weitekamp | B02C 13/30 241/101.2 |
| 5,148,467 | A * | 9/1992 | Sato | A61B 6/105 378/193 |
| 5,645,466 | A * | 7/1997 | Wikle | B23Q 1/5412 451/11 |
| 5,692,738 | A * | 12/1997 | DuVernay | B23Q 1/28 188/72.7 |
| 6,904,664 | B1 * | 6/2005 | Cattell | B23Q 1/5406 269/71 |
| 8,181,321 | B2 * | 5/2012 | Tullmann | B23Q 1/44 269/58 |
| 2002/0153877 | A1 * | 10/2002 | Harris | G01R 1/0408 324/756.02 |
| 2007/0285037 | A1 * | 12/2007 | Potter | B64C 13/50 318/377 |
| 2008/0125904 | A1 * | 5/2008 | Osaki | G05B 19/402 700/170 |
| 2009/0235783 | A1 * | 9/2009 | Duane | B23Q 16/102 74/813 C |
| 2009/0283950 | A1 * | 11/2009 | Bernhard | B23Q 1/28 269/59 |
| 2010/0175505 | A1 * | 7/2010 | Tatsuda | B23Q 16/102 74/813 L |
| 2011/0233879 | A1 * | 9/2011 | Tullmann | B23Q 1/44 279/110 |
| 2012/0266783 | A1 * | 10/2012 | Yoshida | B23Q 1/4857 108/2 |
| 2013/0042604 | A1 * | 2/2013 | Ebihara | B23Q 11/0025 60/407 |
| 2013/0106127 | A1 | 5/2013 | Lipson et al. | |
| 2014/0049011 | A1 * | 2/2014 | Mikoleizig | B23Q 3/12 279/126 |
| 2014/0326107 | A1 * | 11/2014 | Itou | B23Q 3/18 74/813 C |

* cited by examiner

U.S. Patent      Oct. 2, 2018      US 10,087,999 B2
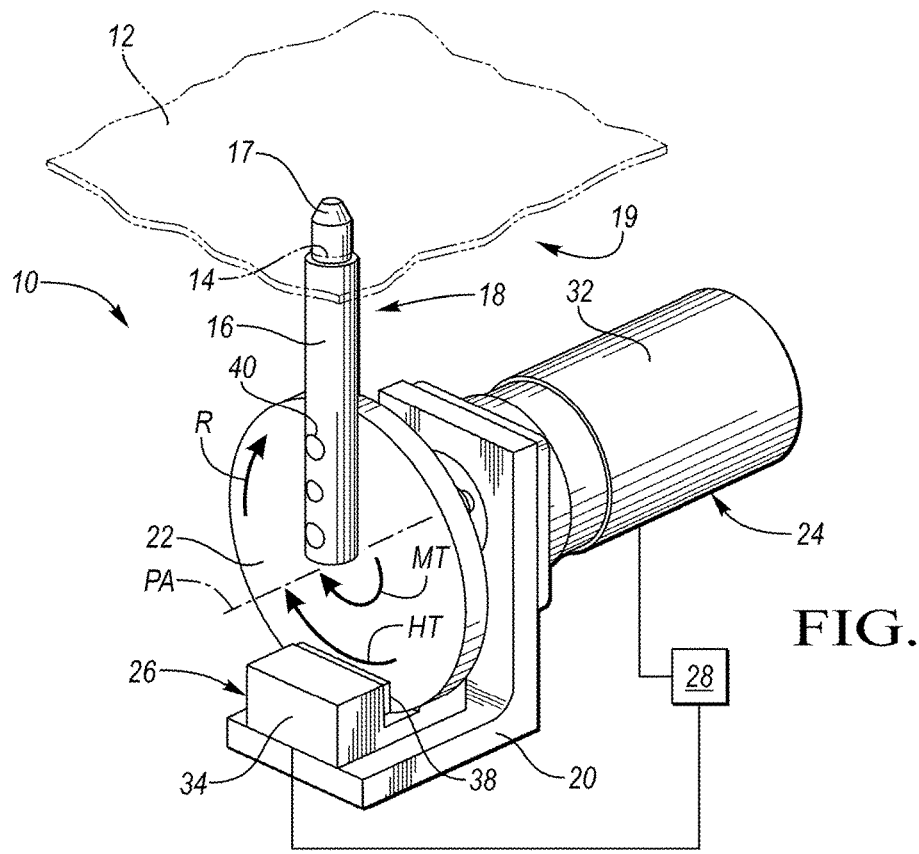
FIG. 1
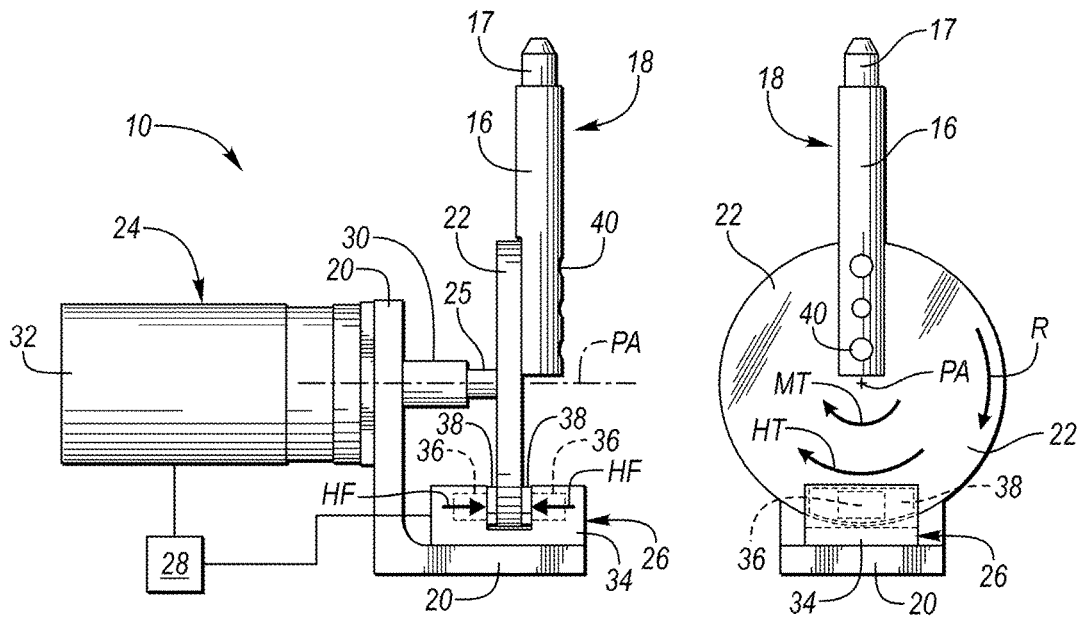
FIG. 2
FIG. 3

TOOLING PIVOT

TECHNICAL FIELD

This disclosure relates to a tooling pivot.

BACKGROUND

A manufacturing system typically operates on parts, subassemblies, and/or assemblies that must be accurately located and securely held and/or clamped in place for manufacturing and assembly operations. For example, a sheet metal part, subassembly, or assembly may need to be accurately located and securely held and/or clamped in place to conduct assembly, welding, and inspection operations in the body shop of a vehicle assembly plant.

Part locating fixtures are normally used for this purpose. Part locating fixtures typically include a plurality of fixed pins that are configured to fit into a plurality of locating holes in the part and one or more clamps that are configured to clamp the part in place. Part locating fixtures are generally useable for only one particular part size and/or shape and usually need to be modified or rebuilt to locate and hold and/or clamp a differently sized and/or shaped part. Multiple part locating fixtures are typically required for the wide variety of parts and the wide variety of assembly and manufacturing operations in a manufacturing plant.

SUMMARY

A tooling pivot and a flexible manufacturing system are provided herein. The tooling pivot is configured to pivot and to hold a tool in a plurality of operating positions. The tooling pivot includes a bracket, a tooling plate, a motor, a brake, and a controller. The tooling plate is connected to the bracket, connectable to the tool, and rotatable. The motor is connected to the bracket and to the tooling plate and is configured to rotate the tooling plate to an operating position. The brake is connected to the bracket and is configured to hold the tooling plate in the operating position. The controller is connected to the motor and to the brake and is configured to control the motion and position of the tooling plate via the motor and to control the holding of the tooling plate via the brake. The brake is configured to release the tooling plate when the motor rotates the tooling plate to the operating position.

The brake may have an energized state and an unenergized state. The brake may be in the energized state when the brake is not holding the tooling plate and the motor is rotating the tooling plate to the operating position. The brake may be in the unenergized state when the brake is holding the tooling plate in the operating position.

The flexible manufacturing system is for manufacturing one or more of a part, a subassembly, and an assembly each having various configurations. The flexible manufacturing system includes a tooling pivot. The tooling pivot is configured to pivot and hold a tool in a plurality of operating positions for manufacturing the one or more of the part, the subassembly, and the assembly. The tooling pivot includes a bracket, a tooling plate, a motor, a brake, and a controller. The tooling plate is connected to the bracket, connectable to the tool, and rotatable. The motor is connected to the bracket and the tooling plate and is configured to rotate the tooling plate to an operating position. The brake is connected to the bracket and is configured to hold the tooling plate in the operating position. The controller is connected to the motor and to the brake and is configured to control the motion and position of the tooling plate via the motor and the holding of the tooling plate via the brake. The brake is configured to release the tooling plate when the motor rotates the tooling plate to the operating position.

The brake may have an energized state and an unenergized state. The brake may be in the energized state when the brake is not holding the tooling plate and the motor is rotating the tooling plate to the operating position. The brake may be in the unenergized state when the brake is holding the tooling plate in the operating position.

The tooling pivot and the flexible manufacturing system enable parts, subassemblies, and/or assemblies having various configurations to be located and held and/or clamped in place for manufacturing and assembly operations. This disclosure applies to any machine or manufacture that locates and holds and/or clamps any item, including but not limited to parts, subassemblies, and assemblies, for any purpose. This disclosure applies to any manufacturing system, including but not limited to manufacturing systems for vehicles and other transportation products, industrial products, construction products, consumer products, and government products.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 1 is a schematic perspective illustration of a tooling pivot including a locating pin connected to the tooling pivot and a part in a located position on the locating pin.

FIG. 2 is a schematic side view illustration of the tooling pivot of FIG. 1.

FIG. 3 is a fragmentary schematic end view illustration of the tooling pivot of FIG. 1.

DETAILED DESCRIPTION

Referring to the drawings, wherein like reference numbers refer to like components throughout the views, FIG. 1 shows a tooling pivot 10 for use in a flexible manufacturing system (not shown). The flexible manufacturing system is for manufacturing and/or assembling one or more of a part, subassembly, or assembly 12, each having various size and shape configurations. The one or more of the part, subassembly, or assembly 12 may be configured with one or more locating holes 14 of various sizes. The part 12 may need to be accurately located and held and/or clamped in place for manufacturing and assembly operations. For example, a sheet metal part, subassembly, or assembly 12 may need to be accurately located and held and/or clamped in place to conduct assembly, welding, and inspection operations in the body shop of a vehicle assembly plant.

Referring now to FIGS. 1-3, the tooling pivot 10 is configured to pivot and to hold a tool 16 in a plurality of operating positions 18. The tool 16 may be a locating pin 17, as shown, for locating the part 12 in a located position 19 in three dimensional space, a clamp (not shown), for clamping the part 12 in the located position 19, or any other tool or device necessary to locate, hold, clamp, and/or conduct manufacturing and/or assembly operations on the one or more of the part, subassembly, or assembly 12. The tooling pivot 10 includes a housing or bracket 20, a tooling plate 22, an actuator or motor 24, a brake 26, and a controller 28.

The tooling pivot 10 may be connected to an immovable structure (not shown), or to a moveable device (not shown), including but not limited to a robot, a conveyor, and a guided vehicle, via the bracket 20. There may be multiple tooling pivots 10 included in the flexible manufacturing system and/or in a particular manufacturing or assembly operation in the flexible manufacturing system.

The tooling plate 22 is connected to the bracket 20 and is rotatable in a rotation direction (arrow R) relative to the bracket 20. The rotation direction (arrow R) may be in a clockwise direction, as shown, or in a counter-clockwise direction (not shown), opposite of the clockwise direction. The tooling plate 22 may be connected to the bracket 20 via a pivot 30 having a pivot axis (axis PA). The pivot 30 may include a bearing (not shown) and/or a bushing (not shown) to facilitate rotation of the tooling plate 22 relative to the bracket 20. The tooling plate 22 may be configured as a substantially round plate or disc, as shown. The tooling plate 22 may include a tooling plate attachment feature (not shown) for connecting the tool 16 to the tooling plate 22. The tool 16 may include a tool attachment feature 40 for connecting the tool 16 to the tooling plate 22.

The motor 24 is connected to the bracket 20 and the tooling plate 22 and is configured to rotate the tooling plate 22 relative to the bracket 20 to the operating position 18. The motor 24 has a locating or motor torque (arrow MT). The motor torque (arrow MT) may be in the clockwise direction, as shown, or in the counter-clockwise direction (not shown), opposite of the clockwise direction. The motor 24 may be an electric servo motor 32, as shown, or any other suitable motor or actuator. The motor 24 may be configured to accurately position the tooling plate 22 relative to the bracket 20 to the operating position 18. The motor 24 may have an output shaft 25. The tooling plate 22 may be connected to the output shaft 25 of the motor 24.

The brake 26 is connected to the bracket 20 and is configured to hold the tooling plate 22 in the operating position 18 when the brake is applied or holding. The brake 26 is configured to release the tooling plate 22 to rotate relative to the bracket 20 when the brake 26 is unapplied, released, or not holding. The brake 26 has an energized state and an unenergized state. The brake 26 may be a passive brake, defined herein as a brake that is applied or holding when in the unenergized state. The brake 26 may be in the energized state when the brake 26 is not holding the tooling plate 22 and the motor 24 is rotating the tooling plate 22 to the operating position 18. The brake 26 may be in the unenergized state when the brake 26 is holding the tooling plate 22 in the operating position 18. Thus, the brake 26 may securely hold the tooling plate 22 when the brake 26 is in the unenergized state. The brake 26 may be a pneumatic brake and may be energized via a pressurized air. The brake 26 may be an electric brake and may be energized via an electric current. The brake 26 may be any suitable brake and may be energized by any suitable energy source.

The brake 26 may include a brake housing 34, a brake actuator 36, and a brake pad 38. The brake 26 may be configured as a disc brake, similar to a disc brake for a vehicle wheel, or may be configured in any other suitable brake configuration. The brake housing 34 may be connected to the bracket 20. The brake actuator 36 may be connected to the brake housing 34 and to the brake pad 38 and may be configured to apply a holding force (arrow HF) to the brake pad 38 and the tooling plate 22 when the brake 26 is in the unenergized state. The brake actuator 36 may be configured to release the holding force (arrow HF) from the brake pad 38 and the tooling plate 22 when the brake 26 is in the energized state. The brake 26 may include a biasing member (not shown) configured to apply the holding force (arrow HF) to the brake pad 38 and the tooling plate 22 when the brake 26 is in the unenergized state.

The brake 26 may apply the holding force (arrow HF) via the brake pad 38 to the tooling plate 22 to hold the tooling plate 22 in the operating position 18 relative to the bracket 20. The holding force (arrow HF) holds and/or clamps the tooling plate 22 in the operating position 18 via a friction force (not shown) resulting from the holding force (arrow HF) acting on the tooling plate 22 via the brake pad 38. The brake 26 has a holding torque (arrow HT). The holding torque (arrow HT) may be in the clockwise direction, as shown, or in the counter-clockwise direction (not show), opposite of the clockwise direction.

The holding torque (arrow HT) is defined herein as the torque required to overcome the holding of the brake 26 and rotate the tooling plate 22 relative to the bracket 20 when the tooling plate 22 is in the operating position 18 and the brake 26 is applied or holding. The holding torque (arrow HT) is sufficient to hold the tool 16 when the tool 16 is in the operating position 18 during manufacturing and/or assembly operations. The holding torque (arrow HT) may be greater than the locating or motor torque (arrow MT), allowing the motor torque (arrow MT) to be less than the torque necessary to hold the tool 16 when the tool 16 is in the operating position 18 during manufacturing and/or assembly operations.

The controller 28 is connected to the motor 24 and the brake 26 and is configured to control the motion and position of the tooling plate 22 relative to the bracket 20 via the motor 24 and to control the holding of the tooling plate 22 relative to the bracket 20 via the brake 26. The brake 26 is unapplied or not holding and releases the tooling plate 22 and the attached tool 16 when the motor 24 rotates the tooling plate 22 to the operating position 18. The brake 26 is applied or holding and holds the tooling plate 22 and the attached tool 16 in the operating position 18 during manufacturing and/or assembly operations.

The plurality of operating positions 18 may include the operating position 18 shown in FIGS. 1-3 and other operating positions 18 in the clockwise direction and/or in the counter-clockwise direction from the operating position 18 shown. The plurality of operating positions 18 are selectable from a continuous range of operating positions (not shown) in the clockwise direction and/or the counter-clockwise direction. The plurality of operating positions 18 are not incremental or fixed positions. The plurality of operating positions 18 are not limited to fixed positions defined by latch mechanisms, detent mechanisms, stops, interferences, mechanical interlocks, or other similar mechanisms. The continuous range of operating positions may be limited only by mechanical interference between the tooling pivot 10 and the tool 16.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A tooling pivot configured to pivot and hold a tool in a plurality of operating positions, comprising:
a bracket;
a tooling plate connected to the bracket, connectable to the tool, and rotatable;

a motor connected to the bracket and the tooling plate and configured to rotate the tooling plate to an operating position;

a brake connected to the bracket and configured to hold the tooling plate in the operating position; and a controller connected to the motor and the brake and configured to control the motion and position of the tooling plate and the holding of the tooling plate;

wherein the brake is configured to release the tooling plate when the motor rotates the tooling plate to the operating position;

wherein the operating position is selectable from a continuous range of operating positions;

wherein the brake has an energized state and an unenergized state;

wherein the brake is in the energized state when the brake is not holding the tooling plate and the motor is rotating the tooling plate to the operating position; and wherein the brake is in the unenergized state when the brake is holding the tooling plate in the operating position.

2. The tooling pivot of claim 1, wherein the tooling plate is configured as a substantially round plate.

3. The tooling pivot of claim 2, wherein the brake is configured as a disc brake.

4. The tooling pivot of claim 1, wherein the motor is an electric servo motor.

5. The tooling pivot of claim 1, wherein the motor has an output shaft; and wherein the tooling plate is connected to the output shaft of the motor.

6. The tooling pivot of claim 1, wherein the motor has a motor torque;

wherein the brake has a holding torque; and wherein the holding torque of the brake is greater than the motor torque of the motor.

7. A flexible manufacturing system for manufacturing one or more of a part, a subassembly, and an assembly each having various configurations, comprising:

a tooling pivot configured to pivot and hold a tool in a plurality of operating positions for manufacturing the one or more of the part, the subassembly, and the assembly, including:

a bracket;

a tooling plate connected to the bracket, connectable to the tool, and rotatable;

a motor connected to the bracket and the tooling plate and configured to rotate the tooling plate to an operating position;

a brake connected to the bracket and configured to hold the tooling plate in the operating position; and a controller connected to the motor and the brake and configured to control the motion and position of the tooling plate and the holding of the tooling plate;

wherein the brake is configured to release the tooling plate when the motor rotates the tooling plate to the operating position;

wherein the operating position is selectable from a continuous range of operating positions;

wherein the brake has an energized state and an unenergized state;

wherein the brake is in the energized state when the brake is not holding the tooling plate and the motor is rotating the tooling plate to the operating position; and wherein the brake is in the unenergized state when the brake is holding the tooling plate in the operating position.

8. The flexible manufacturing system of claim 7, wherein the tooling plate is configured as a substantially round plate.

9. The flexible manufacturing system of claim 8, wherein the brake is configured as a disc brake.

10. The flexible manufacturing system of claim 7, wherein the motor has an output shaft; and wherein the tooling plate is connected to the output shaft of the motor.

* * * * *